United States Patent
Su et al.

(10) Patent No.: US 11,108,529 B2
(45) Date of Patent: Aug. 31, 2021

(54) METHOD AND APPARATUS FOR DETECTING SIGNALS OF A DOWNLINK CONTROL CHANNEL IN A WIRELESS COMMUNICATION SYSTEM

(71) Applicant: Samsung Electronics Co., Ltd, Suwon-si (KR)

(72) Inventors: Di Su, Beijing (CN); Bin Yu, Beijing (CN); Chen Qian, Beijing (CN); Qi Xiong, Beijing (CN); Yingjie Zhang, Beijing (CN); Jingxing Fu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/476,041

(22) PCT Filed: Jan. 5, 2018

(86) PCT No.: PCT/KR2018/000267
§ 371 (c)(1),
(2) Date: Jul. 3, 2019

(87) PCT Pub. No.: WO2018/128468
PCT Pub. Date: Jul. 12, 2018

(65) Prior Publication Data
US 2019/0334687 A1    Oct. 31, 2019

(30) Foreign Application Priority Data
Jan. 6, 2017    (CN) .......................... 201710009421.4

(51) Int. Cl.
*H04L 5/00* (2006.01)
*H04W 48/12* (2009.01)

(52) U.S. Cl.
CPC .......... *H04L 5/0064* (2013.01); *H04L 5/0007* (2013.01); *H04L 5/0023* (2013.01);
(Continued)

(58) Field of Classification Search
CPC ........... H04W 72/0486; H04W 72/042; H04W 36/0055; H04W 72/12; H04W 4/80; H04W 76/27; H04L 5/0048; H04L 1/18
See application file for complete search history.

(56) References Cited

U.S. PATENT DOCUMENTS

| 2013/0242880 A1* | 9/2013 | Miao | H04L 5/0053 370/329 |
| 2017/0289899 A1* | 10/2017 | You | H04W 88/08 |

(Continued)

OTHER PUBLICATIONS

Ericsson, "Summary of Offline Discussion on DL Control Channels", 3GPP TSG RAN WG1 Meeting #87, Nov. 19, 2016, 15 pages, R1-1613311.

(Continued)

*Primary Examiner* — Iqbal Zaidi

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The present disclosure discloses a method for detecting signals of a downlink control channel, including: determining, by a user equipment, an initial control resource set, and receiving common control information from resources specified in the initial control resource set before establishing a radio resource control (RRC) connection; after establishing the RRC connection, determining, by the user equipment, a first control resource set where a user-specific search space is located, and determining the user-specific search space from the first control resource set according to information sent by a base station and/or a user bandwidth capacity and/or a user (Continued)

service type; and detecting, by the user equipment, user control information in the user-specific search space determined. When the present disclosure is implemented, a lower transmission delay and higher transmission reliability can be achieved for a control channel.

19 Claims, 7 Drawing Sheets

(52) U.S. Cl.
CPC .......... *H04L 5/0035* (2013.01); *H04L 5/0094* (2013.01); *H04W 48/12* (2013.01)

(56) References Cited

U.S. PATENT DOCUMENTS

| | | | |
|---|---|---|---|
| 2018/0184410 A1* | 6/2018 | John Wilson | H04L 5/001 |
| 2018/0368056 A1* | 12/2018 | Wang | H04W 48/18 |
| 2020/0288482 A1* | 9/2020 | Yi | H04W 72/121 |

OTHER PUBLICATIONS

Huawei, HiSilicon, "Discussion on search space design for DL control channels", 3GPP TSG RAN WG1 Meeting #87, Nov. 14-18, 2016, 3 pages, R1-1611211.

Qualcomm et al., "WF on common control resource", 3GPP TSG RAN WG1 #87, Nov. 14-18, 2016, 3 pages, R1-1613314.

Qualcomm et al., "WF on RS for common control resource", 3GPP TSG RAN WG1 #87, Nov. 14-18, 2016, 4 pages, R1-1613399.

Huawei et al., "WF on two stage DCI design", 3GPP TSG RAN WG1 #87, Nov. 14-18, 2016, 3 pages, R1-1613668.

International Search Report dated Apr. 18, 2018 in connection with International Patent Application No. PCT/KR2018/000267, 3 pages.

Written Opinion of the International Searching Authority dated Apr. 18, 2018 in connection with International Patent Application No. PCT/KR2018/000267, 7 pages.

* cited by examiner

[Fig. 1]
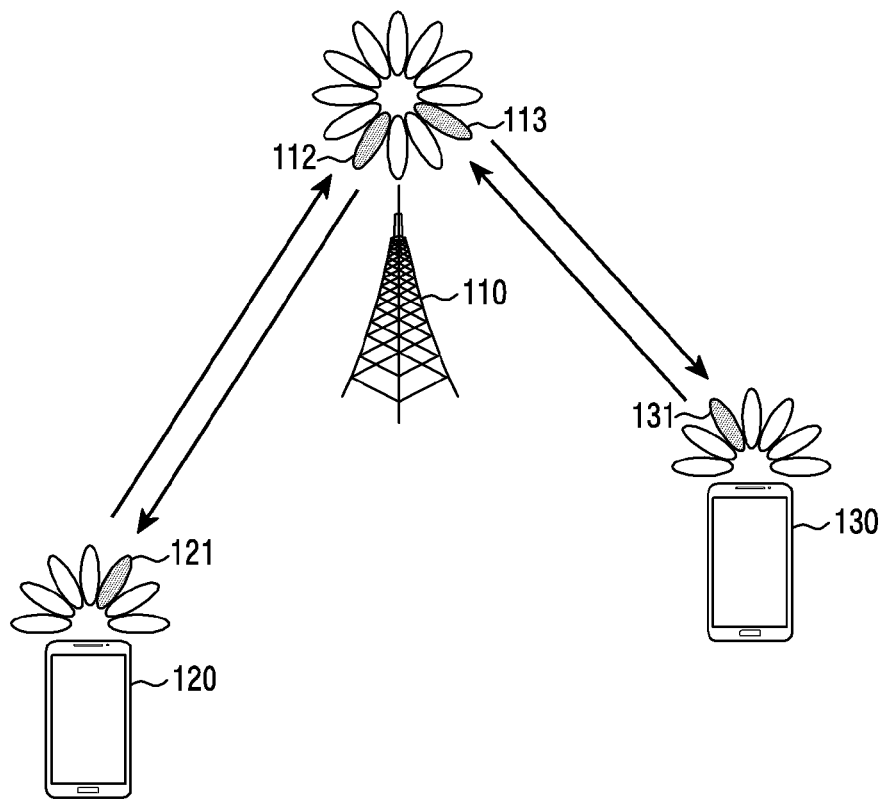
[Fig. 2]
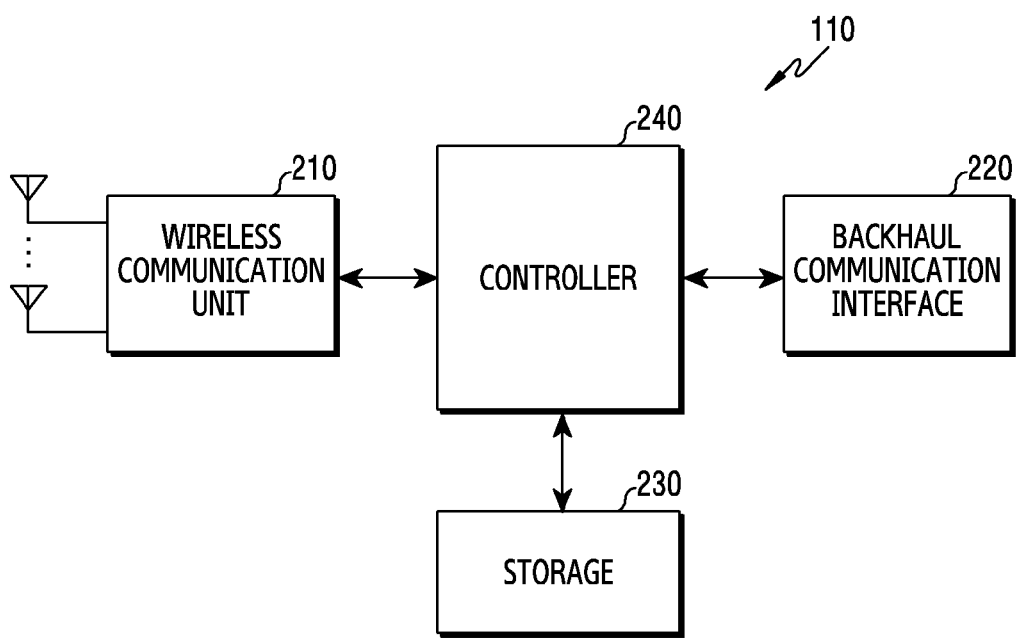

[Fig. 3]
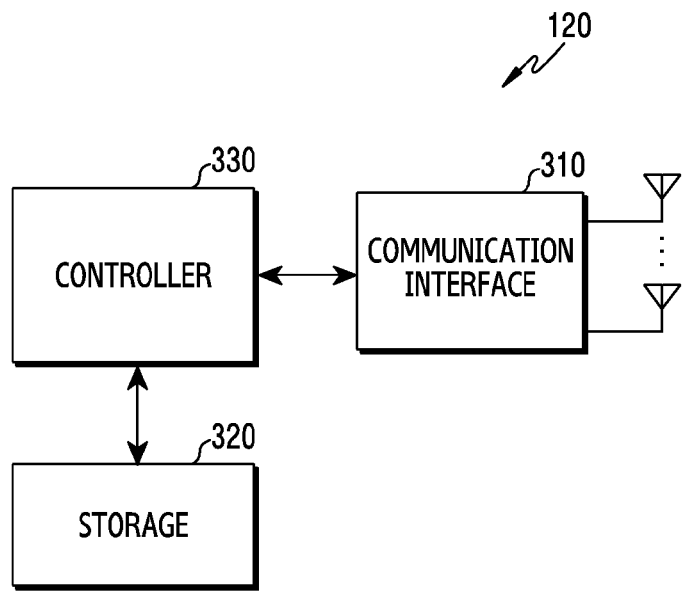
[Fig. 4]
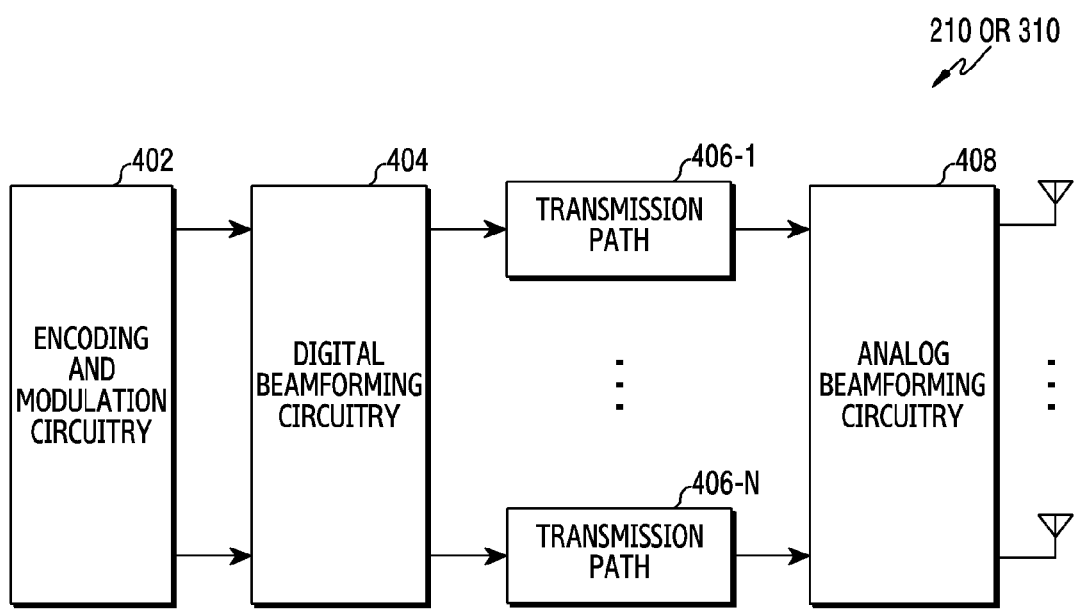

[Fig. 5]
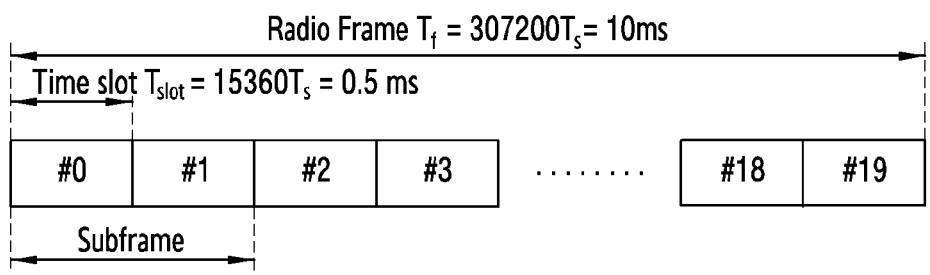
[Fig. 6]
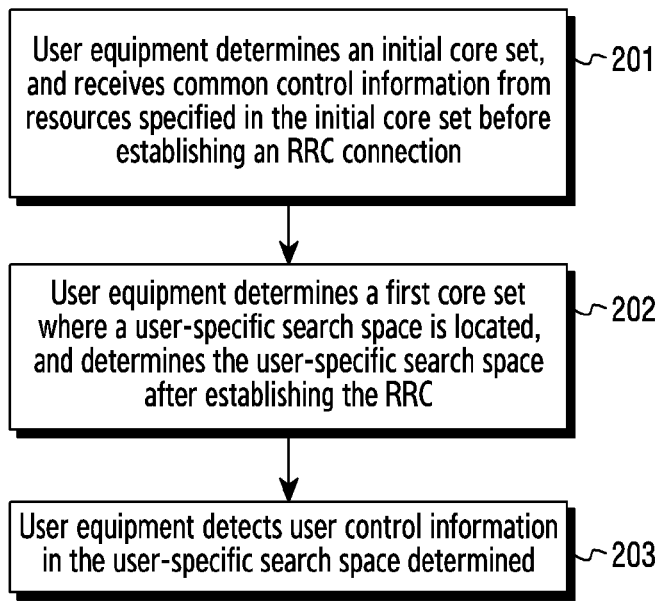

[Fig. 7]
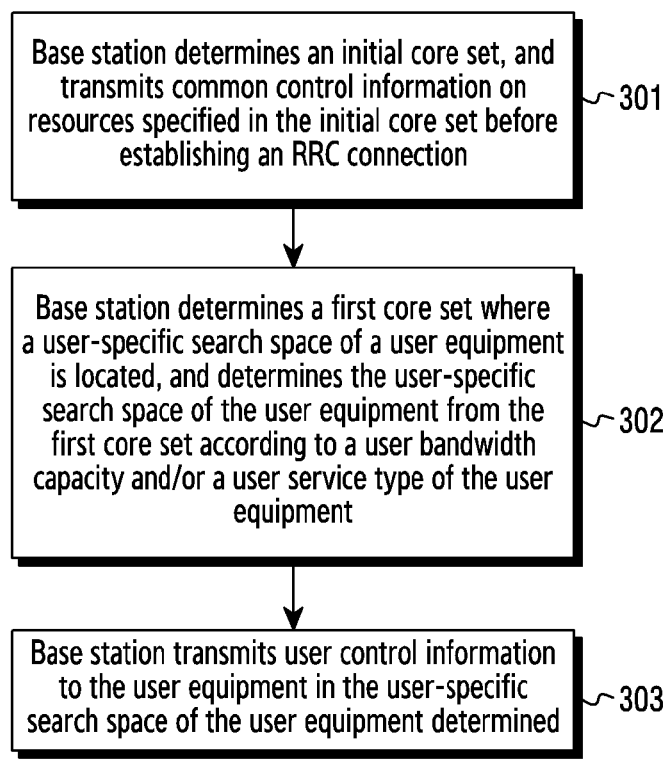

[Fig. 8]
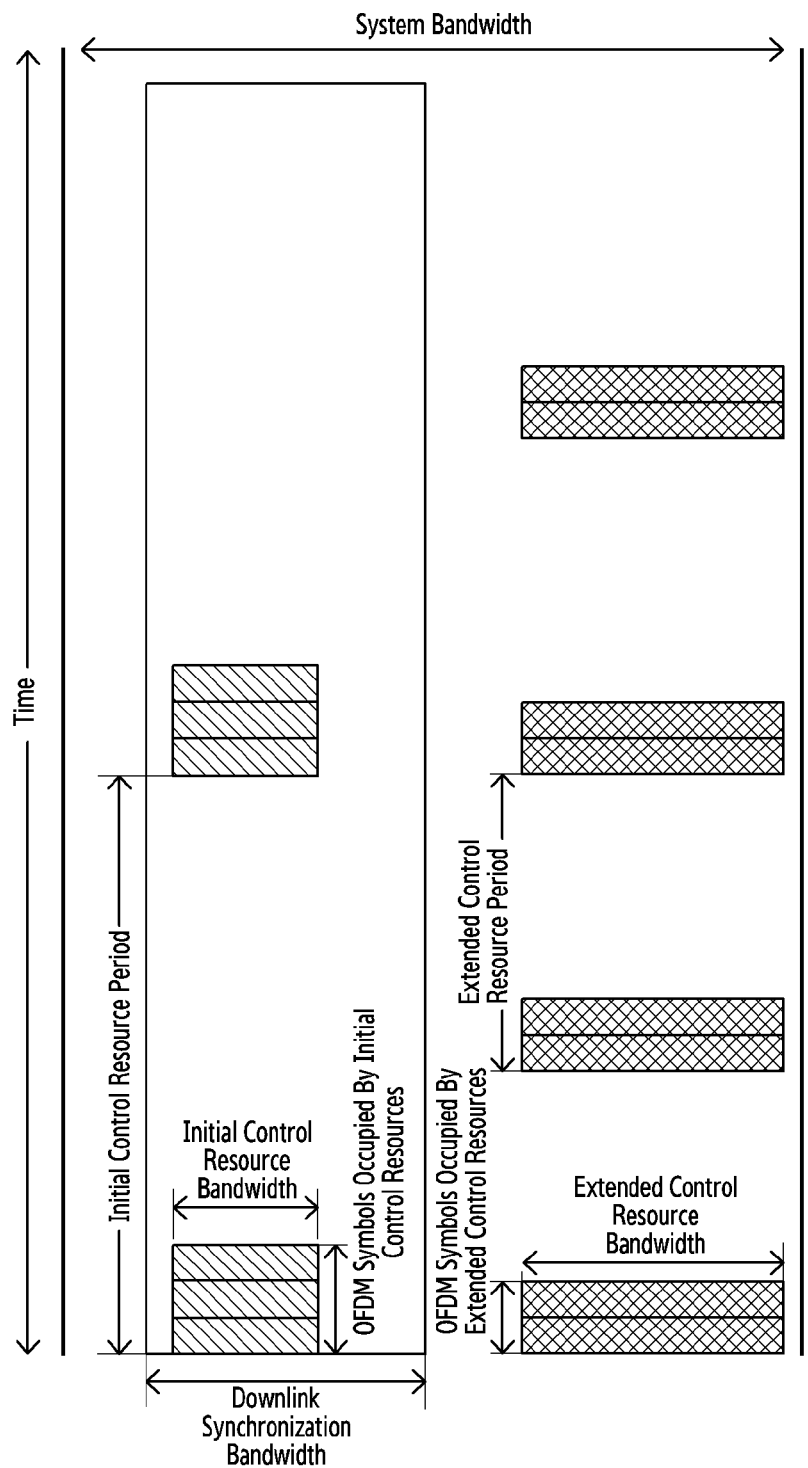

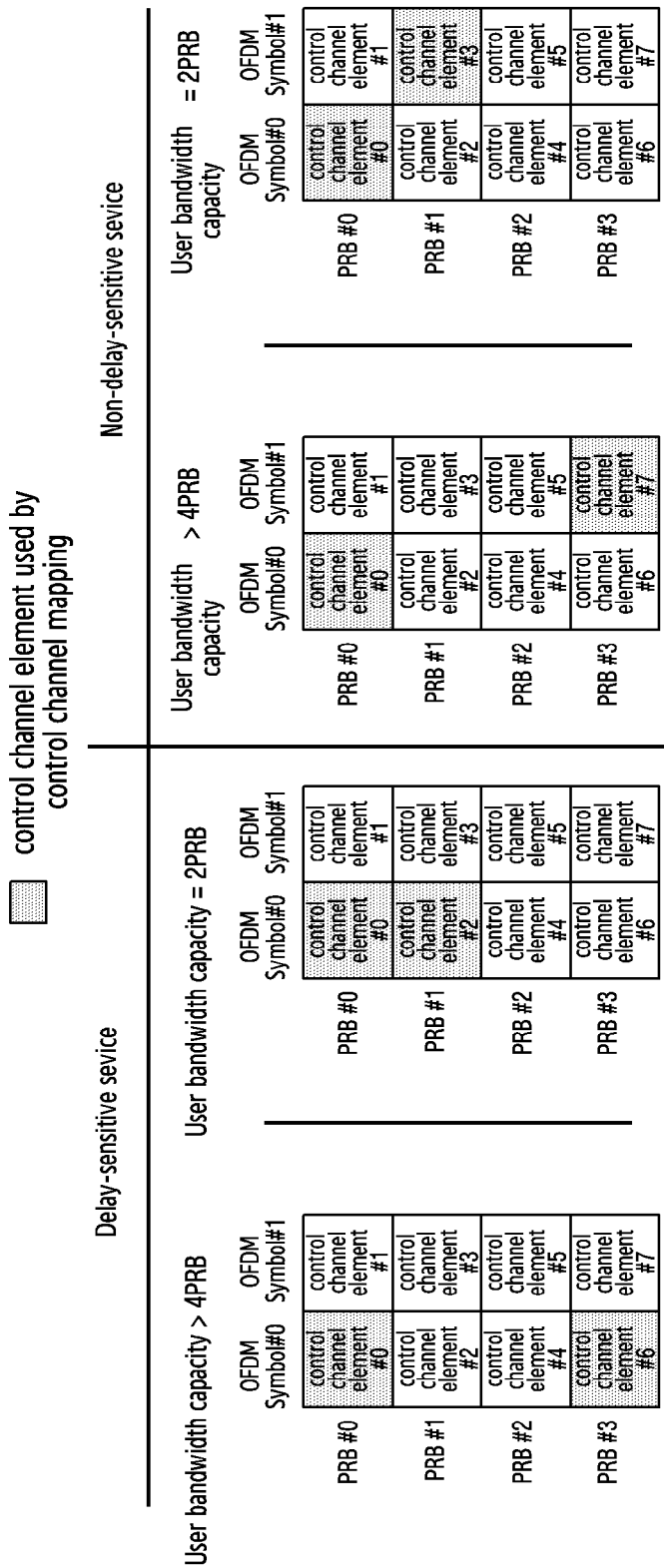
[Fig. 9]

[Fig. 10]
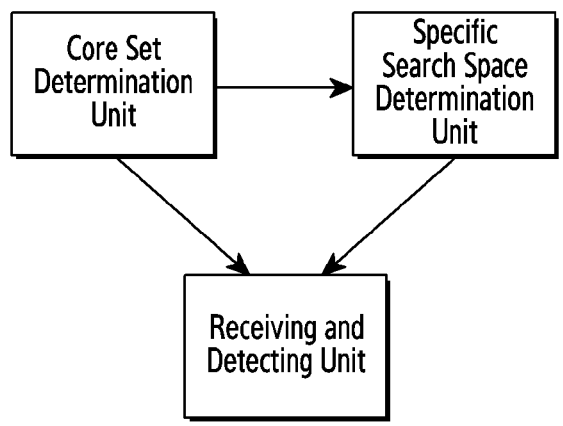
[Fig. 11]
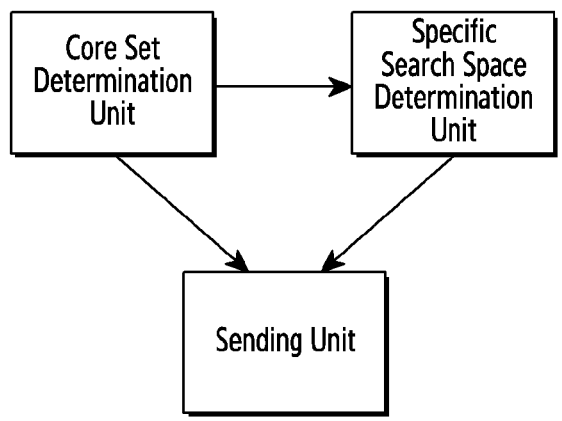

METHOD AND APPARATUS FOR DETECTING SIGNALS OF A DOWNLINK CONTROL CHANNEL IN A WIRELESS COMMUNICATION SYSTEM

CROSS-REFERENCE TO RELATED APPLICATIONS

This application is a 371 of International Application No. PCT/KR2018/000267 filed on Jan. 5, 2018, which claims priority to Chinese Patent Application No. 201710009421.4 filed on Jan. 6, 2017, the disclosures of which are herein incorporated by reference in their entirety.

BACKGROUND

1. Field

The present disclosure relates to a wireless communication system, and in particular to method and apparatus for a downlink control channel in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

To perform communications between a user equipment (UE) and a base station, control information should be provided to the UE. This control information may, for example, indicate resources allocated to the UE for data communication, or comprise information required to transmit/receive data. That is, control information is essential for the UE to perform data communication. Thus, it is required that the UE should properly detect signals of downlink control channel.

SUMMARY

An aspect of the present disclosure is to provide a method for detecting signals of a downlink control channel to reasonably determine a user-specific search space.

Another aspect of the present disclosure is to realize a lower transmission delay and higher transmission reliability of a control channel.

To achieve the objects, the present disclosure uses the following technical solutions:

A method for detecting signals of a downlink control channel includes:

determining, by a user equipment, an initial control resource set, and receiving common control information from resources specified in the initial control resource set before establishing a radio resource control (RRC) connection; in which the initial control resource set includes resources for transmitting common control information of all users;

determining, by the user equipment, a first control resource set where a user-specific search space is located, and determining the user-specific search space from the first control resource set according to information sent by a base station and/or a user bandwidth capacity and/or a user service type; and detecting, by the user equipment, user control information in the user-specific search space determined after establishing the RRC connection.

Preferably, determining the initial control resource set includes:

determining the initial control resource set according to preallocation and/or configuration information sent by the base station.

Preferably, after determining the first control resource set and before determining the user-specific search space, the method further includes:

updating, by the user equipment, the first control resource set where the user-specific search space is located according to the information sent by the base station or according to a preset rule;

in which determining the user-specific search space includes: determining the user-specific search space in an updated first control resource set.

Preferably, the first control resource set is the initial control resource set or an extended control resource set, the extended control resource set is a control resource set allocated by the system other than the initial control resource set, and the extended control resource set is configured to bear control information specific to a designated user; and determining the extended control resource set includes: determining the extended control resource set according to the preallocation and/or the configuration information sent by the base station.

Preferably, the configuration information is sent through common signaling; and/or the configuration information includes values of configuration parameters of an extended control resource set and/or format indexes of the configuration parameters of the extended control resource set, in which each format of the configuration parameters includes a group of values of a part or all of the configuration parameters.

Preferably, determining the first control resource set where the user-specific search space is located includes: determining the first control resource set according to signaling sent by the base station or according to a preset rule.

Preferably, the first control resource set is the extended control resource set, and under a circumstance where a frequency-domain bandwidth of the extended control resource set is larger than a bandwidth capacity of the user equipment, a subset of frequency-domain resources allowable to be used in the user-specific search space is determined from the first control resource set according to the information sent by the base station, or according to a predetermined rule; in which a bandwidth of the subset of frequency-domain resources is not more than the bandwidth capacity of the user equipment.

Preferably, determining the subset of frequency-domain resources according to the information sent by the base station includes: receiving an index range of physical resource blocks (PRBs) for the subset of frequency-domain resources sent by the base station, and determining the subset of frequency-domain resources according to the index range.

Preferably, determining the user-specific search space from the first control resource set according to the information sent by the base station and/or the user bandwidth capacity and/or the user service type includes: determining configuration parameters of the user-specific search space according to the information sent by the base station and/or the user bandwidth capacity and/or the user service type, and determining the user-specific search space according to the configuration parameters.

Preferably, the configuration parameters of the user-specific search space include a start position of the user-specific search space and available control channel elements, the start position of the user-specific search space includes a frequency-domain start position and a time-domain start position, and the available control channel elements include a aggregation level set and a control channel element mapping mode of the user-specific search space.

Preferably, the frequency-domain start position is determined according to indication information sent by the base station or according to presetting; and/or the time-domain start position includes: a time-domain position of a start control channel element used by the user-specific search space in the first control resource set within a single time slot and an index of a time slot used by the user-specific search space in a control resource set available to the user equipment.

Preferably, the time-domain start position is determined according to indication information sent by the base station or according to preconfiguration; and/or determining the index of the time slot according to indication information sent by the base station or according to a user service type, in which the index of the time slot indicated by the base station is determined according to the user service type.

Preferably, the user equipment determines a aggregation level set of the user-specific search space according to the user bandwidth capacity and/or the indication information sent by the base station.

Preferably, the user equipment determining the aggregation level set includes:

determining, by the user equipment, a largest aggregation level according to the user bandwidth capacity and a bandwidth of the first control resource set, or according to the indication information sent by the base station, and then determining the aggregation level set according to the largest aggregation level.

Preferably, determining the aggregation level set of the user-specific search space according to the largest aggregation level includes:

after the user equipment determining the largest aggregation level, determining, by the user equipment, the aggregation level set according to a preset mapping relationship between largest aggregation levels and aggregation level sets of the user-specific search space; or the user equipment extracting a set index from the indication information sent by the base station, and determining the aggregation level set according to a preset mapping relationship between largest aggregation level and set index combinations and aggregation level sets of the user-specific search space.

Preferably, the mapping relationship of the control channel elements determined is a continuous mapping mode or a dispersed mapping mode.

Preferably, the dispersed mapping mode is that a single control channel element is dispersedly mapped, or the single control channel element is continuously mapped and several control channel elements that constitute a user control channel are dispersedly mapped in the frequency domain or time domain within the first control resource set; and/or the continuous mapping mode is that a single control channel element is continuously mapped, and several control channel elements that constitute the user control channel are continuously mapped in the frequency domain or time domain within the first control resource set.

Preferably, the control channel element mapping mode is determined and adaptively adjusted according to the user service type and/or the user bandwidth capacity, or according to indication information sent by the base station.

Preferably, before determining and adaptively adjusting the control channel element mapping mode according to the user service type and/or the user bandwidth capacity, the method further includes: reporting, by the user equipment, a capacity and/or a service type of the user equipment.

Preferably, under a circumstance where the user service type is a delay-sensitive service, a way to determine the control channel element mapping mode is first performing frequency-domain mapping and then performing time-domain mapping, or limiting the control channel elements to be mapped within N orthogonal frequency division multiplexing (OFDM) symbols, where N is a positive integer preset or notified by the base station; and/or under a circumstance where the user service type is a non-delay-sensitive service, a way to determine the control channel element mapping mode is performing dispersed mapping in both the frequency domain and the time domain; and/or under a circumstance where the user bandwidth capacity is larger than a bandwidth occupied by continuously arranging the control channel elements in the frequency domain, determining the mapping mode of the resource control units is dispersed mapping in the frequency domain.

Preferably, the user service type is the delay-sensitive service, and under a circumstance where the user control information needs to be interleaved, then interleaving the user control information within a same OFDM symbol.

Preferably, updating the first control resource set according to the information sent by the base station includes: updating the first control resource set according to an index of an updated first control resource set sent by the base station; and/or updating the first control resource set according to the preset rule includes: in response to a cache state report reported by the user equipment meeting a preset condition, performing the updating after a preset time duration after completing uploading of cached data.

A method for transmitting signals of a downlink control channel includes:

determining, by a base station, an initial control resource set, and transmitting common control information on resources specified in the initial control resource set before establishing a radio resource control (RRC) connection; in which the initial control resource set comprises resources for transmitting common control information of all users;

for a user equipment that accesses to the base station, determining, by the base station, a first control resource set where a user-specific search space of the user equipment is located, and determining the user-specific search space of the user equipment from the first control resource set according to a user bandwidth capacity and/or a service type of the user equipment; and sending, by the base station, user control information of the user equipment to the user equipment in the user-specific search space of the user equipment determined.

An apparatus for detecting signals of a downlink control channel includes: a control resource set determination unit, a specific search space determination unit and a receiving and detecting unit; in which the control resource set determination unit is configured to determine an initial control resource set and a first control resource set where a user-specific search space is located;

the specific search space determination unit is configured to determine the user-specific search space from the first control resource set according to information sent by a base station and/or a user bandwidth capacity and/or a user service type; and the receiving and detecting unit is configured to receive common control information from resources specified in the initial control resource set before establishing a radio resource control (RRC) connection; and detect user control information in the user-specific search space determined.

An apparatus for transmitting signals of a downlink control channel includes: a control resource set determination unit, a specific search space determination unit and a sending unit; in which the control resource set determination unit is configured to determine an initial control resource set and a first control resource set where a user-specific search space of each user equipment that accesses to a base station is located;

the specific search space determination unit is configured to, for a user equipment that accesses to the base station, determine a user-specific search space for the user equipment from the first control resource set of the user equipment according to a user bandwidth capacity and/or a user service type of the user equipment; and the sending unit is configured to send common control information on resources specified in the initial control resource set before establishing a radio resource control (RRC) connection, in which the initial control resource set comprises resources for transmitting common control information of all users; and send user control information of the user equipment to the user equipment in the determined user-specific search space of the user equipment.

As is seen from the foregoing technical solutions, in the present disclosure, user equipment determines an initial control resource set, and receives common control information from resources specified in the initial control resource set before establishing a radio resource control (RRC) connection; after the RRC connection is established, the user equipment determines a first control resource set where a user-specific search space is located, and determines the user-specific search space from the first control resource set according to information sent by a base station and/or a user bandwidth capacity and/or a user service type; and detects user control information in the user-specific search space.

According to various embodiments of the present disclosure, the user-specific search space can be determined reasonably according to the configuration by the base station and/or according to the bandwidth and/or the service type of the user equipment, and the signal detection performance can be improved.

BRIEF DESCRIPTION OF THE DRAWINGS

FIG. 1 illustrates a wireless communication system according to various embodiments of the present disclosure;

FIG. 2 illustrates the BS in the wireless communication system according to various embodiments of the present disclosure;

FIG. 3 illustrates the terminal in the wireless communication system according to various embodiments of the present disclosure;

FIG. 4 illustrates the communication interface in the wireless communication system according to various embodiments of the present disclosure;

FIG. 5 is a schematic diagram of a frame structure in a LTE system;

FIG. 6 is a schematic diagram of a basic flow of a method for detecting signals of a downlink control channel according to the present disclosure;

FIG. 7 is a schematic diagram of a basic flow of a method for transmitting signals of a downlink control channel according to the present disclosure;

FIG. 8 is a schematic diagram of an initial control resource set and an extended control resource set;

FIG. 9 is an example of selecting a mapping mode based on user service types and bandwidth capacities;

FIG. 10 is a schematic diagram of a basic structure of an apparatus for detecting signals of a downlink control channel according to the present disclosure;

FIG. 11 is a schematic diagram of a basic structure of an apparatus for transmitting signals of a downlink control channel according to the present disclosure;

DETAILED DESCRIPTION

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for detecting control signals of downlink control channel to reasonably determine a user-specific search space in a wireless communication system. The user-specific search space can be expressed as 'user equipment (UE)—specific search space', alternatively.

The terms referring a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5$^{th}$ generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor. According to various embodiments, the controller 240 may includes control resource set determination unit, specific search space determination unit, and sending unit as illustrated in FIG. 11. Here, CORESET determination unit, specific search space determination unit, and sending unit may be a command/code temporarily resided in the controller 240, a storage space that stores the command/code, or a part of circuitry of the controller 240.

According to exemplary embodiments of the present disclosure, the controller 240 may determine a UE-specific search space from a control resource set based on at least one of information sent by a base station, a bandwidth capacity of the UE or a type of a service associated with the UE, and transmit, to the UE, control information for the UE through the UE-specific search space. For example, the controller 240 may control the base station to perform operations according to the exemplary embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP). According to various embodiments, the controller 330 may includes control resource set determination unit, specific search space determination unit, and receiving and detecting unit as illustrated in FIG. 10. Here, control resource set determination unit, specific search space determination unit, and receiving and detecting unit may be a command/code temporarily resided in the controller 330, a storage space that stores the command/code, or a part of circuitry of the controller 330.

According to exemplary embodiments of the present disclosure, the controller 330 may determine a UE-specific search space from a control resource set based on at least one of information sent by a base station, a bandwidth capacity of the UE or a type of a service associated with the UE, and detect control information for the UE in the UE-specific search space. For example, the controller 330 may control the terminal to perform operations according to the exemplary embodiments of the present disclosure.

According to various embodiments of the present disclosure, the control resource set is an initial control resource set or an extended control resource set. The initial control resource set comprises resources in which common control information for all UEs associated with the base station. The extended control resource set comprises resources in which UE-specific control information is transmitted, and is determined based on at least one of a pre-allocation or configuration information set by the base station.

According to various embodiments of the present disclosure, if e control resource set is the extended control resource set and a bandwidth of the extended control resource set is larger than the bandwidth capacity of the UE, a subset of frequency-domain resources allowable to be used in the UE-specific search space is determined from the control resource set based on at least one of the information sent by the base station, or a predetermined rule. Herein, a bandwidth of the subset of frequency-domain resources is less than or equal to the bandwidth capacity of the UE.

According to various embodiments of the present disclosure, the communication interface 310 is configured to receive an index range of physical resource blocks (PRBs) for the subset of frequency-domain resources sent by the base station, and the controller 330 is configured to determine the subset of frequency-domain resources based on the index range According to various embodiments of the present disclosure, the controller 330 is further configured to determine configuration parameters of the UE-specific search space based on at least one of the information sent by the base station, the bandwidth capacity of the UE or a type of the service associated with the UE, and determine the user-specific search space based on the configuration parameters. The configuration parameters comprise a start position of the UE-specific search space and available control channel elements, the start position of the UE-specific search space comprises a frequency-domain start position and a time-domain start position, and the available control channel elements comprises an aggregation level set and a control channel element mapping mode of the UE-specific search space.

According to various embodiments of the present disclosure, the frequency-domain start position and the time-domain start position is determined based on at least one of indication information sent by the base station or preconfigured information. The time-domain start position comprises a time-domain position of a start control channel element used by the UE-specific search space in the control resource set within a single time slot, and an index of a time slot used by the UE-specific search space in at least one control resource set available to the UE.

According to various embodiments of the present disclosure, the index of the time slot is indicated by the base station based on the type of the service associated with the UE.

According to various embodiments of the present disclosure, the aggregation level set is determined based on at least one of a preset mapping relationship between a largest aggregation level and aggregation level sets of the UE-specific search space, or the user equipment extracting a set index from the indication information sent by the base station.

According to various embodiments of the present disclosure, the control channel element mapping mode comprises at least one of a continuous mapping mode or a dispersed mapping mode. The dispersed mapping mode is that a single control channel element is dispersedly mapped, or the single control channel element is continuously mapped and several control channel elements that constitute a user control channel are dispersedly mapped in a frequency domain or a time domain within the control resource set. The continuous mapping mode is that a single control channel element is continuously mapped, and several control channel elements that constitute the user control channel are continuously mapped in the frequency domain or the time domain within the control resource set.

According to various embodiments of the present disclosure, if the service is a delay-sensitive service, the controller 330 is configured to determine the control channel element mapping mode by performing a frequency-domain mapping and then performing a time-domain mapping, or limiting the control channel elements to be mapped within N orthogonal frequency division multiplexing (OFDM) symbols, where N is a positive integer preset or notified by the base station. If the service is a non-delay-sensitive service, the controller 330 is configured to determine the control channel element mapping mode by performing a dispersed mapping in both the frequency domain and the time domain. If the bandwidth capacity of the UE is larger than a bandwidth occupied by continuously arranging the control channel elements in the frequency domain, the controller 330 is configured to determine the control channel element mapping mode by performing the dispersed mapping in the frequency domain.

According to various embodiments of the present disclosure, if the service is a delay-sensitive service and user control information needs to be interleaved, the controller 330 is further configured to interleave the user control information within a same OFDM symbol.

According to various embodiments of the present disclosure, the controller is further configured to determine the control resource set based on an index of the control resource set sent by the base station, and determine the control resource set after a preset time duration from when uploading of cached data is completed.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

In a 3rd generation partnership project (3GPP) long term evolution (LTE) system, the length of each radio frame is 10 ms, and each radio frame is divided into 10 subframes. One downlink transmission time interval (TTI) is defined for one subframe. FIG. 5 shows a schematic diagram of a frame structure in which each downlink subframe includes two time slots, and for a normal cyclic prefix (CP) length, each time slot contains 7 orthogonal frequency division multiplexing (OFDM) symbols; and for an extended CP length, each time slot contains 6 OFDM symbols.

The granularity of frequency-domain resource allocation is physical resource block (PRB), and one PRB contains 12 consecutive subcarriers in the frequency domain, and corresponds to one time slot in the time domain. One subframe contains two time slots, so there are two PRBs on the same subcarriers, defined as a PRB pair in LTE. The LTE system uses first 1~3 OFDM symbols of a downlink subframe to transmit downlink control information, and the downlink control information occupies all PRBs within the system bandwidth in the frequency domain, and may be regarded as a control channel space of the system. In the control channel space, a base station transmits downlink control channel (PDCCH), physical control format indication channel (PC-FICH), automatic retransmission request acknowledgement (ACK/NACK) information, and necessary reference signals. The remaining resources of the downlink subframe may be used to transmit downlink data.

The LTE system defines a common search space and a user-specific search space for PDCCH transmission, and specifies a set of available time-frequency resources for a base station to transmit a PDCCH. The common search space is configured to transmit control information to UEs that have not established a connection, or page a group of users or notify updates of system information. The user-specific search space is configured to transmit scheduling information for uplink or downlink data transmission for a UE which is in a connected state. The smallest granularity that schedules PDCCH resources in the LTE is control channel element (CCE), and the LTE supports scheduling multiple CCEs to transmit one piece of DCI, which is referred to as CCE aggregation, and an aggregation level (AL) represents the number of CCEs that can be used to transmit one piece of DCI. No matter whether for the common search space or for the user-specific search space, it is agreed that a series of control channel resources starting from an agreed position are consecutively occupied for PDCCH transmission. The search spaces specify a transmission start position and a set of available ALs for PDCCH transmission, and the UE traverses all the sizes and positions of time-frequency resources possible for transmitting a PDCCH indicated in the search spaces by means of blind detection, and tries to perform demodulation and decoding for each possibility, and verifies it using a corresponding radio network temporary identifier (RNTI) (e.g., a cell RNTI (C-RNTI)) scrambled cyclic redundancy check (CRC), and a PDCCH that is verified correctly is a PDCCH actually scheduled by the base station.

Specifically, the common search space defined in the LTE includes a search space with aggregation levels being 4 CCEs and 8 CCEs; and the user-specific search space includes a search space with aggregation levels being 1 CCE, 2 CCEs, 4 CCEs and 8 CCEs, as shown in Table 1. For each transmission mode, a UE will track PDCCHs that have DCI formats of two different sizes, and therefore, for the common search space, a UE tracks 2*(4+2)=12 candidate PDCCHs, and for the user-specific search space, a UE tracks 2*(6+6+2+2)=32 candidate PDCCHs.

TABLE 1

| Type | Search Space $S_k^{(L)}$ | | Number $M^{(L)}$ of candidate PDCCHs |
|---|---|---|---|
| | Aggregation Level L | Number of CCEs | |
| User-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

CCEs occupied by a PDCCH search space $S_k^{(L)}$ are:

$$L \cdot \{(Y_k+m) \bmod \lfloor N_{CCE,k}/L \rfloor\}+i, \ i=0,1,\ldots L-1$$

where L is an aggregation level, i.e., the number of CCEs occupied by the search space;

K is an index of a subframe; and $N_{CCE,k}$ is the total number of CCEs within the subframe k.

For the common search space, $Y_k=0$, that is, the CCE positions occupied by common search spaces of all the UEs are same; and for the user-specific search space, $Y_k=(A \cdot Y_{k-1}) \bmod D$, where $Y_{-1}=n_{RNTI} \neq 0$, A=39827, D=65537, and $n_{RNTI}$ is a user RNTI value.

The user-specific search space is related to the user RNTI value and the subframe index. That is, after a user RNTI value of a UE is determined, positions of CCEs occupied by the user-specific search space in a certain subframe are determined.

The methods for determining the common search space and the user-specific search space in the LTE system are described as above.

The next generation of communication system will use resources that have a larger bandwidth on a higher frequency band, and in this case, the system bandwidth will be far larger than the current LTE largest bandwidth, 20 MHz. In this case, the system will support serving UEs that have different bandwidth capacities at the same time, i.e., the transmitting bandwidths and receiving bandwidths of different users are different, and the smallest bandwidth of the users is far less than the system bandwidth. And in this case, if the control channels over the entire bandwidth are multiplexed as that in LTE, it will cause a UE that has a smaller bandwidth capacity to be unable to receive a downlink control channel. In current 3GPP 5G standard formatted, the concept of control resource set (CORESET) is introduced, and a control resource set includes multiple consecutive or non-consecutive PRBs for downlink control channel transmission. The system may configure multiple control resource sets as demanded. Meanwhile, the current 3GPP 5G standard specifies that the unit of allocated resources of the control channel is a PRB, and then the downlink control channel of the user occupies positions of an integer number of PRBs.

Meanwhile, when considering the bandwidth capacities of different users, a frequency-domain bandwidth of a control resource set that is used to transmit common control information cannot exceeds the smallest bandwidth capacity of the user, therefore, the frequency-domain bandwidth of the control resource set used for transmitting the common control information will be far less than the system bandwidth, which part of control resource sets need not only to burden the transmission of common control information, but also to burden the transmission of user-specific control information. Since the bandwidth is limited, when there are too many users in the system, a situation where the control resources are limited will occur. For this situation, the standard discussion supports the system to additionally configure several control resource sets to balance the load of the control space.

The control channel resource mapping in the 5G communication system has essential differences with the LTE system, and how to define a downlink control channel search space configured based on the control resources and meanwhile can be compatible to different bandwidth capacities and service requirements of users is a new issue, as the traditional implementation solution of LTE cannot be used.

To make the objects, technical schemes and advantages of the present disclosure clearer, the present disclosure will be described in detail hereinafter with reference to accompanying drawings and embodiments.

The present disclosure provides a method for detecting signals of a downlink control channel, and as shown in FIG. 6, a basic flow of the method includes the following steps:

Step 201: a user equipment determines an initial control resource set, and receives common control information from resources specified in the initial control resource set before establishing a radio resource control (RRC) connection.

In the present disclosure, the initial control resource set includes resources for transmitting common control information of all users in a cell.

Step 202, the user equipment determines a first control resource set where a user-specific search space is located, and determines the user-specific search space in the first control resource set according to information sent from a base station and/or a user bandwidth capacity and/or a service type.

In the present step, a set of control resources where the user-specific search space is located is necessary to be determined, and in the following, the set of control resources where the user-specific search space is located is referred to as the first control resource set. In the first control resource set determined, the user equipment determines the user-specific search space according to the information sent by the base station and/or the user bandwidth capacity and/or the service type, so the method is applicable to user equipments that have different bandwidth capacities and/or service requirements in 5G communication systems. Preferably, the base station may autonomously select configuration parameters related to the user-specific search space based on the user bandwidth capacity and/or the service type according to a certain rule, or according to a rule agreed by the base station and the user equipment. The configuration parameters related to the user-specific search space may include time-domain and frequency-domain start positions of the user-specific search space, a largest aggregation level and/or an aggregation level set of the user-specific search space, a control channel element mapping mode, etc., so as to determine the user-specific search space.

Step 203: the user equipment detects user control information in the user-specific search space determined.

The user equipment performs blind detection for a downlink control channel according to the determined user-specific search space, i.e., obtaining user-specific control information, which procedure is similar to that in the LTE system, and will not be elaborated herein.

Meanwhile, the present disclosure further provides a method for transmitting signals of a downlink control channel, and as shown in FIG. 7, a basic flow of the method includes the following steps:

Step 301, a base station determines an initial control resource set, and transmits common control information on resources specified in the initial control resource set before establishing a radio resource control (RRC) connection.

As described in the foregoing, the initial control resource set includes resources for transmitting common control information of all users and the initial control resource set is within a bandwidth of a downlink synchronization signal.

Step 302, the base station determines a first control resource set where a user-specific search space of a user equipment is located, and determines the user-specific search space of the user equipment from the first control resource set according to a user bandwidth capacity and/or a user service type of the user equipment.

For a certain user equipment, the base station determines a first control resource set of the user equipment, and determines a user-specific search space of the user equipment from the first control resource set determined. Preferably, the base station may autonomously configure configuration parameters related to the user-specific search space according to a certain rule, or may select the configuration parameters related to the user-specific search space according to a user bandwidth capacity and/or a user service type of the user equipment according to a rule consistent with that of the user equipment. The configuration parameters related to the user-specific search space may include time-domain and frequency-domain start positions of the user-specific search space, a largest aggregation level and/or an aggregation level set of the user-specific search space, a control channel element mapping mode, etc., so as to determine the user-specific search space.

Step 303, the base station transmits user control information of the user equipment to the user equipment in the user-specific search space of the user equipment determined.

The processing of the present disclosure described above will be described in detail in the following with reference to detailed embodiments.

Embodiment 1

In the present embodiment, how to configure a control resource set will be described.

First, the system needs to configure a control resource set within a bandwidth of a downlink synchronization signal in a preallocated or quasi-static manner. Common control information of all users (including downlink and uplink scheduling information, paging scheduling information, system information updating indications, etc. of users that have not established an RRC connection) all needs to be transmitted on positions of resources specified in the control resources set. For description purpose, the control resource set is referred to as an initial control resource set.

Basically, control resource sets available to a cell include the initial control resource set. Configuration parameters of the initial control resource set include indexes of PRBs occupied in the frequency domain, the number of OFDM symbols occupied in the time domain, and an occurrence period. The base station may determine the initial control resource set according to the pre-allocation, or may also configure the initial control resource set on its own. On the user equipment side, the configuration parameters of an initial control resource set may be configured in a preallocated manner by the system. That is, one or more of the parameters such as the number of PRBs occupied, the number of OFDM symbols occupied, and a period may be fixedly configured by the system (e.g., specified according to a protocol), and a preallocated parameter does not need to be notified through signaling. Or one or more configuration parameters of the initial control resource set may be quasi-statically configured by the base station, and may be notified to the user through common signaling, e.g., carried through a broadcast channel, a system message, or a PCFICH.

When the base station notifies the configuration parameters of the initial control resources to the user equipment though signaling, it may directly notify specific values of the configuration parameters, for example, the indexes of PRBs occupied, the indexes of OFDM symbols occupied, the number of time slots or the number of subframes spaced between periods. This way of configuration has a greater degree of freedom of configuration but requires greater signaling overhead. Or, the base station may distribute configuration parameters by configuring different formats, and each format may include a set of specific values of the parameters, an index of a format carried by signaling, and after the user equipment receives the index of the format, the user equipment may know a detailed value of each parameter by looking up a table. For example, a format 1 indicates that PRBs occupied by a control resource set are all of PRBs in the downlink synchronization bandwidth, the number of OFDM symbols is the first 3 symbols in each time slot, and an interval period is 4 time slots. Or the base station may notify the user equipment through signaling by way of combining detailed values and formats. For example, the values of some parameters may be notified through the signaling, and the values of other parameters may be notified by looking up a table through configuring different formats. Accordingly, when the user equipment determines the initial control resource set, it may determine it according to the signaling sent by the base station and/or parameters preallocated by the system.

In addition to the initial control resource set, the base station may configure additional control resource set(s) as needed, for example, when considering situations where the resources of the initial control resource set is overloaded, or there is a user, a bandwidth capacity of which is larger than the downlink synchronization bandwidth. A control resource set configured in addition to the initial control resource set is referred to as an extended control resource set. In this case, the control resource sets available to the cell include the initial control resource set and the extended control resource set. The extended control resource set may be one or more, and resources included in the extended control resource set are used to transmit control information other than the control information transmitted by the initial control resource set, for example, used to transmit control information to a user in an RRC connected state, or used to transmit paging information to a user, user context of which is reserved for MMES. On the base station side, the base station may determine one or more extended control resource sets according to preallocation, or the base station may allocate one or more extended control resource sets on its own. On the user equipment side, parameters of the extended control resource set may be notified in a preallocated and/or quasi-static manner, and specific values of the parameters may be different from those of the initial control resource set, e.g., the frequency-domain bandwidth (or the indexes of PRBs occupied), the number of OFDM symbols, an interval period, etc. FIG. 8 shows a schematic diagram of an initial control resource set and an extended control resource set. Accordingly, when the user equipment determines the extended control resource set, it may determine it according to the signaling sent by the base station and/or the parameters preallocated by the system.

As can be seen from the above, the configuration resource sets available to the cell may include only the initial control resource set, or may include both the initial control resource set and one or more extended control resource sets. If the configuration resource sets available to the cell only include the initial control resource set, then for a user equipment in the cell, a user-specific search space thereof is also located in the initial control resource set. If the configuration resource sets available to the cell include the initial control resource set and an extended control resource set, then when the base station determines the first control resource set where the user-specific search space of the user equipment is located, the base station may determine the first control resource set is the initial control resource set or the extended control resource set, which may be configured by the base station on its own, or may be determined according to a preset rule. For a user equipment in the cell, a user-specific search space thereof may be located on the initial control resource set or may be located on the extended control resource set. When the base station allocates the extended control resource set on it own, for a user equipment, the first control resource set of which is the extended control resource set, then the base station send configuration information of the extended control resource set to the user equipment. The present embodiment mainly introduce how the system configures the initial control resource set and the extended control resource set, and how the base station and the user equipment determine the initial control resource set and the extended control resource set. For a certain user equipment, how to determine which control resource set the user-specific search space of the user equipment is located will be described in detailed in the following.

Embodiment 2

In the present embodiment, a method for determining a control resource set and a method for determining a user-specific search space will be described.

Step 1: a user equipment and a base station determine an initial control resource set.

To receive common control information of a cell, the user equipment needs to determine the initial control resource set, and how to determine the initial control resource set has been described in above Embodiment 1, and will not be elaborated herein. In addition, when taken requirements such as an additional load into consideration, control resource sets available to the cell may further include an extended control resource set, and how to determine the extended control resource set has been described in above Embodiment 1, and will not be elaborated herein.

Step 2: the base station sends common control information on the initial control resource set before an RRC connection is established, and the user equipment receives the common control information from the initial control resource set; and the user equipment determines a first control resource set where a user-specific search space of the user equipment is located after the RRC connection is established.

Before the RRC connection is established, the base station send control information on the resources specified in the initial control resource set within a downlink synchronization bandwidth, and the user equipment needs to receive the control information from the resources specified in the initial control resource set within the downlink synchronization bandwidth, and a search space monitored by the user equipment is a common search space, and the common search space may be designed as that used in traditional LTE systems, which will not be elaborated herein; and after the RRC connection is established, the base station sends user-specific control information in the user-specific search space, and the user equipment needs to receive the user-specific control information in the user-specific search space, e.g., uplink and downlink scheduling grant information. The user-specific search space uses time-frequency resources indicated by a certain control resource set which may be time-frequency resources indicated by the initial control resource set or time-frequency resources indicated by the extended control resource set.

When the user equipment determines the first control resource set where the user-specific search space is located, the user equipment may determine it according to an implicit or explicit notification sent by the base station.

Specifically, the base station may configure specific search spaces of some users to use time-frequency resources indicated by the extended control resource set and may also configure specific search spaces of some users to use time-frequency resources indicated by the initial control resources set. The base station may perform the configuration according to a notification of configuration information such as user-specific signaling, e.g., notifying indexes of control resource sets available to the specific search spaces. This way of configuration needs additional signaling payload. Or the configuration of the first control resource set may be notified in an implicit way. For example, when the base station configures one initial control resource set and one extended control resource set, the system may agree on that monitoring a user-specific search space on which control resource set is distinguished using a user unique identification code (e.g., a C-RNTI) mod 2. For example, for a user, an identification code of which mod 2 is 0, it still uses the initial control resource set as the first control resource set, and for a user, an identification code of which mod 2 is 1, it will use the extended control resource set as the first control resource set.

When the initial control resource set is configured, a bandwidth of the initial control resource set is not larger than a bandwidth of a user that has the smallest bandwidth capacity in the system. Therefore, if a user-specific search space defined in the initial control resource set is configured for the user, the bandwidth of the initial control resource set is certainly not larger than the bandwidth of the user.

If the user is configured with a user-specific search space defined in the extended control resource set, then a situation where the frequency-domain bandwidth indicated by the control resource set configured is larger than or smaller than the bandwidth capacity of the user may occur. When the frequency-domain bandwidth indicated by the control resource set configured is smaller than the bandwidth capacity of the user, it will not affect downlink receiving of the user; however, if the frequency-domain bandwidth of the control resource set configured is larger than the bandwidth capacity of the user, then it may cause the user unable to receive control signaling completely, which issue may be solved according to an avoiding rule agreed by the system or according to a notification through signaling.

For example, the system is not allowed to configure a control resource set, a bandwidth of which is larger than that of the user capacity, for the user-specific search space; or the system may notify a subset of frequency-domain resources in the first control resources set available to the user to the user in an explicit or implicit way. For example, the base station may explicitly notify a PRB index range (a frequency-domain bandwidth of the PRB index range is not larger than the user bandwidth) that can be used by the user-specific search space in the first control resource set, or the system may agree that the user-specific search space can use PRBs within a range of the user bandwidth starting from a frequency-domain start position of the user-specific search space in the first control resource set. Compared to the explicit way of notification, by the implicit way of notification, less signaling overhead is needed, but the degree of freedom of configuration may be lost.

Step 3: The user equipment and the base station determine the user-specific search space.

After the base station determines the first control resource set where the user-specific search space is located, the base station may configure the user-specific search space on its own according to a certain rule, or may follow a principle of consistency with the user equipment, determine the user-specific search space according to the user bandwidth capacity and/or the user service type.

After a user in the connected state determines a first control resource set where a user-specific search space of the user is located, the user may determine the user-specific search space according to information sent by the base station and/or the bandwidth capacity and/or the service type of its own.

Preferably, a user equipment may determine configuration parameters of a user-specific search space of the user equipment according to information sent by the base station and or a bandwidth capacity and/or a service type, and the configuration parameters may include a search space start position, available control channel elements, etc. The base station may determine configuration parameters of a user-specific search space of a certain user equipment according to a user bandwidth capacity and/or a service type of the user equipment, and the configuration parameters of the user-specific search space may include a search space start position, available control channel elements, etc., and may send configuration information related to the configuration parameters to the user equipment. In addition, the configuration parameters of the user-specific search space mentioned herein refer to parameters that are used to determine a user-specific search space, and they may not be obtained through configuration. In the following, how to determine configuration parameters will be described in detail.

Determine the start position of a user-specific search space

The start position of a user-specific search space includes two dimensions: a frequency-domain start position and a time-domain start position, and it may be explicitly indicated through signaling or may be implicitly indicated according to a rule preset by the system. Take the configuration of a frequency-domain start position as an example, an index of a start PRB of a search space in the control resource set configured may be notified in an explicit way through common or user-specific signaling, or may be notified in an implicit way through obtaining the index of the start PRB by using a user-unique identification code to calculate according to a formula, which is similar to that in the LTE system.

The frequency-domain start position of the user-specific search space contains meanings in two aspects, in which one is a time-domain position of a start control channel element used by the user-specific search space within a single time slot in the first control resource set, and the other is an index of a time slot where the user-specific search space is located in the first control resource set. In the LTE system, a user-specific search space occupies time slots continuously, and a user needs to perform blind detection on several continuous time slots; the present disclosure allows to configure time slot indexes of a user-specific search space, so that the user blindly detects and receiving user-specific control signaling every a certain period of time, which can effectively reduce the number of times of blind detection of the user, and can reduce the power consumption at the user, though in this way, the delay of data transmission may be increased, the method has decisive advantages when the user service is not delay-sensitive. Based on this, preferably, the base station may configure the time slot indexes for a search space according to the service type of the user, and for a non-delay-sensitive service, the method may configure non-continuous time slot indexes to reduce the power consumption of the user equipment; and for a delay-sensitive service, the method may configure continuous time slot indexes so as to finish the detection of control information as soon as possible. Same to the way of configuring the frequency-domain start position, two kinds of parameters of the time-domain start position of the user-specific search space may be indicated by an implicit or explicit notification.

2. Determine the available control channel elements of a user-specific search space The user-specific search space may need to define available control channel elements, i.e., control channel elements available starting from time-domain and frequency-domain start positions configured. The control channel elements may be configured from two aspects, in which one aspect is an aggregation level set of the user-specific search space, and the other aspect is positions of the available control channel elements (i.e., a mapping mode where a single control channel uses several control channel elements).

The number of control channel elements actually included in the user-specific search space is called an aggregation level (AL), and the user equipment may adaptively determine and adjust the aggregation level according to a certain rule. For example, the larger the bandwidth capability of the use equipment is, the higher the aggregation level of the use equipment is. That is, for a user that has a larger bandwidth capacity, the aggregation level of a control channel of the user may be adjusted to be higher, so as to reduce the coding rate of the control channel and improve the reliability of control channel transmission.

Alternatively, the use may also obtain the aggregation level through blind detection. The user may first obtain an aggregation level set of the user-specific search space, and starting from time-frequency start positions specified for the user-specific search space, traverse all possible aggregation levels in the aggregation level set of the user-specific search space according to a designated control channel element mapping mode, to try to decode the control channel, and if the decoding is correct, then it indicates that the current aggregation level is an aggregation level used by the control channel transmitted by the base station. The aggregation level set of the user-specific search space may be determined according to indication information sent by the base station and/or according to the user bandwidth. For example, the base station may notify a largest aggregation level of the user-specific search space to the user, or the user may determine the largest aggregation level on its own, and further obtain the aggregation level set of the user-specific search space according to a certain rule. The aggregation level set of the user-specific search space may be determined according to the largest aggregation level in the following two ways:

one way is that the base station and the user equipment determine the largest aggregation level, and then according to a mapping relationship between largest aggregation levels and aggregation level sets of user-specific search spaces agreed by the base station and the user equipment, obtain the aggregation level set of the user-specific search space, e.g., an implementation of narrow band internet of things (NB-IoT).

In another way, the base station determines the largest aggregation level of the user equipment and determines an aggregation level set of the user-specific search space according to the service type of the user equipment; then determines a set index corresponding to the determined aggregation level set according to a mapping relationship between largest aggregation level and set index combinations and aggregation level sets of user-specific search spaces, and then sends the set index to the user equipment. The user equipment receives the set index of the aggregation level set of the user-specific search space sent by the base station, and determines a largest aggregation level set, and determines the aggregation level set of the user-specific search space according to the mapping relationship between largest aggregation level and set index combinations and the set indexes and aggregation level sets of use-specific search spaces; for example, taking the largest aggregation level is 24 as an example, the base station notifies a set index "1", indicating that the aggregation level set of the user specific search space is {1, 4, 6, 8, 12, 24}, and notifies that a set index "2", indicating that the aggregation level set of the user-specific search space is {1,12,24}. That is, for values of different largest aggregation level configurations, the aggregation level sets of the user-specific search space indicated by different set indexes may be agreed in advance, and the user equipment can know the aggregation level set of the user-specific search space by looking up a table according to the largest aggregation level and the aggregation level set index of the user-specific search space. In this way, after the largest aggregation level is determined, the base station may configure an aggregation level set of the user-specific search space for the user equipment as demands. For example, when the service type of the user equipment has a power saving requirement for the user equipment, then a smaller aggregation level set of the user-specific search space may be configured so as to reduce the number of times of blind detection performed by the user equipment, and reduce the power consumption.

The base station may determine a largest aggregation level for a corresponding user equipment according to the user bandwidth capability of the user equipment, and notify the largest aggregation level to the corresponding user equipment in an explicit or implicit way. For example, the base station notifies the largest aggregation level to the user equipment through explicit signaling, or adaptively selects the largest aggregation level according to a preset rule in an implicit way, without being notified by the base station through signaling: the system works together to determine the largest aggregation level based on the user bandwidth capacity and a frequency-domain bandwidth configured to the first control resource set. Assuming that the control channel elements occupy 12 subcarriers of one PRB in the frequency domain, and occupies one OFDM symbol in the time domain, the following table shows an example of a user equipment obtaining a largest aggregation level in an implicit way, in which the user equipment can know the largest aggregation level based on the bandwidth capacity of its own and the bandwidth of a first control resource set, without being notified through signaling.

TABLE 2

| Control Resource Set | User Bandwidth Capacity | |
|---|---|---|
| | 5M | 20M |
| 5M | Largest Aggregation Level 8 | Largest Aggregation Level 8 |
| 20M | Largest Aggregation Level 8 | Largest Aggregation Level 24 |

In addition to the aggregation level, a control channel element mapping mode further needs to be configured for the user-specific search space. The base station may configure the control channel element mapping mode for the user according to a certain rule, or the base station and the user equipment adjust the control channel element mapping mode according to a certain rule; for a given aggregation level, different control channel element mapping modes may be used. The control channel element mapping mode may include a continuous or dispersed mapping mode, and the continuous mapping mode means that the control channel (consisting of several control channel elements, the number of which is the number of aggregation levels) of the user equipment is continuously mapped in the frequency domain or in the time domain within the control resource set to which the control channel belongs, and the dispersed mapping means that the control channel of the user equipment is not continuously mapped in the frequency domain and/or in the time domain within the control resource set to which the control channel belongs. For the continuous mapping, a detailed method of mapping may be that the mapping mode of a single control channel element is continuous, and several control channel elements that constitute the user control channel are continuously mapped in the frequency domain or in the time domain within the control resource set to which they belong; and for the dispersed mapping, a detailed method of mapping is that the mapping mode of a single control channel element is dispersed, or the mapping mode of a single control channel element is continuous, and several control channel elements that constitute the user control channel is dispersedly mapped in the frequency domain or in the time domain within the control resource set. For example, through autonomous adjustment, the base station and the user equipment select the control channel element mapping mode based on the user service type and user bandwidth capacity, and to guarantee that the base station and the user equipment have the same basis of selection, the system may agree that the control channel element mapping mode is adaptively adjusted after the user equipment reports the bandwidth capacity and the service type of the user equipment successfully; the way of configuration and the adaptive adjustment may use a same mapping mode selection rule, but needs additional signaling to perform downlink notification, which though increases the signaling overhead, can avoid the non-synchronization of adaptive adjustment occurs on the receiving and sending terminals caused due to abnormally reporting the capacity and service type of the user equipment. When the service type of the user is a delay-sensitive type service, the user equipment may select to mapping the control channel elements first in the frequency domain and then in the time domain, or may restrict the control channel elements to be mapped within a limited number of OFDM symbols, and the number of OFDM symbols mapped may be preconfigured or may be explicitly notified by the base station through signaling. If there is an interleaver, then the interleaver may be designed to perform interleaving within a same OFDM symbol, so as to guarantee that the control channel occupies the least number of OFDM symbols under a same aggregation level, and reduce the transmission duration of the control channel. That is, if the control information needs to be interleaved, then the interleaving is performed within a same OFDM symbol; but for a non-delay-sensitive service, it may select to dispersedly mapping the control channel elements in the time domain and in the frequency domain to achieve a larger diversity gain and improve the reliability of the control channel transmission. When the bandwidth capacity of the user is larger than the bandwidth occupied by the control channel elements, the number of which is the number of aggregation levels, arranged continuously in the frequency domain, and may select the control channel element mapping mode distributed in the frequency domain, so as to realize a higher diversity gain. Take the aggregation level being 2 as an example, FIG. 9 is an example of selecting a mapping mode based on the user service type and bandwidth capacity.

When the user equipment obtains all the parameter information of the user-specific search space by means of adaptive selection or configuration by the base station, the parameter information includes information such as a start position, a largest aggregation level (and/or an aggregation level set of the user-specific search space), and a control channel element mapping mode, the user equipment may determine the user-specific search space, and further perform blind detection on all possible positions of the control channel in the user-specific search space, until the decoding is performed correctly. The procedure is the same with that in the LTE system, and will not be elaborated any more.

After a period of time of signal detection in the manner described above, the base station and the user equipment may update the control resource set to which the user-specific search space belongs for load balancing or user equipment power saving purposes. In particular, the base station may update the first control resource set where the user-specific search space of the user equipment is located according to the system condition or according to a preset rule; and when the base station determines the user-specific search space, it may determine the user-specific space within an updated first control resource set. For example, the base station reallocates the user to a new control resource set that has a low load to receive control information through explicit signaling, or allocates a user that has a small amount of data transmission to a control resource set that has a relatively small bandwidth in the frequency domain to receive control information, so as to save the power consumption of the user equipment. The control resource set to which the user-specific search space belongs may be updated explicitly or implicitly. For example, the base station notifies an index of the updated control resource set to the user equipment through explicit signaling, to enable the user equipment to switch to the configured new control resource set to receive control information after a period of time; or the system agrees a rule, and the user equipment and the base station determine whether currently a control resource set to which the user-specific search space belongs needs to be changed according to the rule, without being notified through signaling. For example, for uplink transmission, the system may agree that the user equipment and the base station are all based on a buffer state report (BSR) reported by the user equipment, and after caching the uplink transmission of the data, the user equipment automatically switches to a default control resource set which may be the initial control resource set after a given period of time.

The above is detailed implementations of the method for detecting signals according to the present disclosure. The present disclosure further provides an apparatus for detecting signals and an apparatus for transmitting signals, respectively used to implement the above method for detecting and the method for transmitting. FIG. 10 is a schematic diagram of a basic structure of an apparatus for detecting signals according to the present disclosure. As shown in FIG. 10, the apparatus includes: a control resource set determination unit, a specific search space determination unit and a receiving and detecting unit.

The control resource set determination unit is configured to determine an initial control resource set and a first control resource set where a user-specific search space is located. The specific search space determination unit is configured to determine the user-specific search space from the first control resource set according to information sent by a base station and/or a user bandwidth capacity and/or a user service type. The receiving and detecting unit is configured to, before the user equipment establishes an RRC connection, receive common control information from resources specified in a control resource set of the cell; and detect user control information in the user-specific search space after the RRC connection is established.

FIG. 11 is a schematic diagram of a basic structure of an apparatus for transmitting signals according to the present disclosure. As shown in FIG. 11, the apparatus includes: a control resource set determination unit, a specific search space determination unit and a sending unit.

The control resource set determination unit is configured to determine an initial control resource set and a first control resource set where a user-specific search space of each user equipment that accesses to the base station is located. The specific search space determination unit is configured to, for a user equipment that accesses to the base station; determine a user-specific search space for the user equipment from the first control resource set of the user equipment according to a user bandwidth capacity and/or a user service type of the user equipment. The sending unit is configured to send common control information on resources specified in the initial control resource set before establishing an RRC connection; the initial control resource set includes resources used to transmit common control information of all users; and send user control information of the user equipment to the user equipment in the user-specific search space of the user equipment.

Through the solution of the present disclosure, can realize adaptively adjusting a user-specific search space according to a configuration result of a user bandwidth capacity, a user service type and a control resource set in a 5G system where a downlink control channel is transmitted based on several control resource sets, and can realize a lower transmission delay and higher transmission reliability of the control channel.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

What is described in the foregoing are only embodiments of the present disclosure, and should not be construed as limitations to the present disclosure. Any changes, equivalent replacements, modifications made without departing from the scope and spirit of the present disclosure are intended to be included within the protecting scope of the present disclosure.

The invention claimed is:

1. A method performed by a user equipment (UE) in a wireless communication system, the method comprising:
   receiving, from a base station, an index of an initial control resource set (CORESET), wherein the index indicates a number of resource blocks and a number of symbols;
   receiving, from the base station, common control information on a common search space of the initial CORESET;
   receiving, from the base station, configuration parameters information for an extended CORESET, wherein the configuration information, includes information on an aggregation level set for available control channel elements (CCEs); and
   receiving, from the base station, UE-specific control information on a UE-specific search space of the extended CORESET.

2. The method of claim 1, wherein, if a bandwidth of the extended CORESET is larger than a bandwidth capacity of the UE, a subset of frequency-domain resources allowable to be used in the UE-specific search space is determined from the extended CORESET based on at least one of the information sent by the base station, or a predetermined rule, and
   wherein a bandwidth of the subset of frequency-domain resources is less than or equal to the bandwidth capacity of the UE.

3. The method of claim 2, further comprising:
   receiving an index range of physical resource blocks (PRBs) for the subset of frequency-domain resources sent by the base station; and
   determining the subset of frequency-domain resources based on the index range.

4. The method of claim 1,
wherein the configuration information comprises a start position of the UE-specific search space and the available CCEs,
wherein the start position of the UE-specific search space comprises a frequency-domain start position and a time-domain start position, and
wherein the available CCEs comprises a CCE mapping mode of the UE-specific search space.

5. The method of claim 4,
wherein the frequency-domain start position and the time-domain start position is determined based on at least one of indication information sent by the base station or preconfigured information, and
wherein the time-domain start position comprises:
a time-domain position of a start control channel element used by the UE-specific search space in the extended CORESET within a single time slot, and
an index of a time slot used by the UE-specific search space in at least one CORESET available to the UE.

6. The method of claim 5, further comprising:
transmitting, to the base station, information for a service type of the UE,
wherein the index of the time slot is indicated by the base station based on the service type.

7. The method of claim 6, wherein the service type is a delay-sensitive service, and
if user control information needs to be interleaved, interleaving the user control information within a same OFDM symbol.

8. The method of claim 4, wherein the aggregation level set is determined based on at least one of:
a preset mapping relationship between a largest aggregation level and aggregation level sets of the UE-specific search space, or
the user equipment extracting a set index from indication information sent by the base station.

9. The method of claim 4,
wherein the CCE mapping mode comprises at least one of a continuous mapping mode or a dispersed mapping mode,
wherein the dispersed mapping mode is that a single control channel element is dispersedly mapped, or the single control channel element is continuously mapped and several control channel elements that constitute a user control channel are dispersedly mapped in a frequency domain or a time domain within the extended CORESET, and
wherein the continuous mapping mode is that a single control channel element is continuously mapped, and several control channel elements that constitute the user control channel are continuously mapped in the frequency domain or the time domain within the extended CORESET.

10. The method of claim 4, further comprising:
determining the CCE mapping mode by performing a frequency-domain mapping and then performing a time-domain mapping, or limiting the control channel elements to be mapped within N orthogonal frequency division multiplexing (OFDM) symbols, where N is a positive integer preset or notified by the base station, if a service of the service type is a delay-sensitive service;
determining the CCE mapping mode by performing a dispersed mapping in both the frequency domain and the time domain, if a service of the service type is a non-delay-sensitive service; and
determining the CCE mapping mode by performing the dispersed mapping in the frequency domain, if a bandwidth capacity of the UE is larger than a bandwidth occupied by continuously arranging the CCEs in the frequency domain.

11. A base station in a wireless communication system, the base station comprising:
a transceiver; and
at least one processor, operatively coupled to the transceiver, configured to control the transceiver to:
transmit, to a user equipment (UE), an index of an initial control resource set (CORESET), wherein the index indicates a number of resource blocks and a number of symbols,
transmit, to the UE, common control information on a common search space of the initial CORESET,
transmit, to the UE, configuration, information for an extended CORESET, wherein the configuration information includes information on an aggregation level set for available control channel elements (CCEs), and
transmit, to the UE, UE-specific control information on a UE-specific search space of the extended CORESET.

12. The base station of claim 11,
wherein the configuration information comprises a start position of the UE-specific search space and the available CCEs,
wherein the start position of the UE-specific search space comprises a frequency-domain start position and a time-domain start position, and
wherein the available CCEs comprises a CCE mapping mode of the UE-specific search space.

13. A user equipment (UE) in a wireless communication system, the UE comprising:
a transceiver; and
at least one processor, operatively coupled to the transceiver, configured to control the transceiver to:
receive, from a base station, an index of an initial control resource set (CORESET), wherein the index indicates a number of resource blocks and a number of symbols,
receive, from the base station, common control information on a common search space of the initial CORESET,
receive, from the base station, configuration information for an extended CORESET, wherein the configuration information includes information on an aggregation level set for available control channel elements (CCEs), and
receive, from the base station, UE-specific control information on a UE-specific search space of the extended CORESET.

14. The UE of claim 13,
wherein the configuration information comprises a start position of the UE-specific search space and the available CCEs,
wherein the start position of the UE-specific search space comprises a frequency-domain start position and a time-domain start position, and
wherein the available CCEs comprises a CCE mapping mode of the UE-specific search space.

15. The UE of claim 14, wherein the frequency-domain start position and the time-domain start position is determined based on at least one of indication information sent by the base station or preconfigured information, and wherein the time-domain start position comprises:
a time-domain position of a start control channel element used by the UE-specific search space in the extended CORESET within a single time slot, and
an index of a time slot used by the UE-specific search space in at least one CORESET available to the UE.

16. The UE of claim 15, wherein the at least one processor is further configured to:
transmit, to the base station, information for a service type of the UE,
wherein the index of the time slot is indicated by the base station based on the service type.

17. The UE of claim 14, wherein the aggregation level set is determined based on at least one of:
a preset mapping relationship between a largest aggregation level and aggregation level sets of the UE-specific search space, or
the user equipment extracting a set index from indication information sent by the base station.

18. The UE of claim 14,
wherein the CCE mapping mode comprises at least one of a continuous mapping mode or a dispersed mapping mode,
wherein the dispersed mapping mode is that a single control channel element is dispersedly mapped, or the single control channel element is continuously mapped and several control channel elements that constitute a user control channel are dispersedly mapped in a frequency domain or a time domain within the extended CORESET, and
wherein the continuous mapping mode is that a single control channel element is continuously mapped, and several control channel elements that constitute the user control channel are continuously mapped in the frequency domain or the time domain within the extended CORESET.

19. A method performed by a base station in a wireless communication system, the method comprising:
transmitting, to a user equipment (UE), an index of an initial control resource set (CORESET), wherein the index indicates a number of resource blocks and a number of symbols;
transmitting, to the UE, common control information on a common search space of the initial CORESET;
transmitting, to the UE, configuration information for an extended CORESET, wherein the configuration information includes information on an aggregation level set for available control channel elements (CCEs); and
transmitting, to the UE, UE-specific control information on a UE-specific search space of the extended CORESET.

* * * * *